United States Patent
Kost

[11] Patent Number: 5,402,345
[45] Date of Patent: Mar. 28, 1995

[54] METHOD FOR ESTIMATING SPEED OF A BRAKED VEHICLE

[75] Inventor: Friedrich Kost, Kornwestheim, Germany

[73] Assignee: Robert Bosch GmbH, Stuttgart, Germany

[21] Appl. No.: 856,748

[22] PCT Filed: Jul. 10, 1991

[86] PCT No.: PCT/EP91/01286
§ 371 Date: Mar. 24, 1992
§ 102(e) Date: Mar. 24, 1992

[87] PCT Pub. No.: WO92/02392
PCT Pub. Date: Feb. 20, 1992

[30] Foreign Application Priority Data
Aug. 4, 1990 [DE] Germany ............ 40 24 815.1

[51] Int. Cl.$^6$ .............................. B60T 8/32
[52] U.S. Cl. .................. 364/426.02; 73/510; 73/518; 180/197; 303/95; 303/103

[58] Field of Search ............ 364/426.01, 426.02, 364/426.03, 565; 180/197; 303/91, 94, 95, 97, 99, 100, 102, 103, 104, 109, 110; 73/510, 511, 518

[56] References Cited
U.S. PATENT DOCUMENTS

| | | | |
|---|---|---|---|
| 4,818,037 | 4/1989 | McEnnan | 303/97 |
| 4,912,744 | 3/1990 | Hurst | 303/109 |
| 4,981,190 | 1/1991 | Nakayama et al. | 180/197 |
| 5,029,089 | 7/1991 | Braschel | 364/426.02 |
| 5,083,631 | 1/1992 | Nakayama | 180/197 |
| 5,157,611 | 10/1992 | Ikeda et al. | 364/426.02 |

FOREIGN PATENT DOCUMENTS
8902382 3/1989 WIPO.

Primary Examiner—Gary Chin
Assistant Examiner—Collin W. Park
Attorney, Agent, or Firm—Spencer, Frank & Schneider

[57] ABSTRACT

To determine the free-rolling wheel peripheral speed $V_{fRi}$, the brake pressure at one wheel is reduced at various times and the wheel speed and the braking force at this wheel are then determined. Using the steering angle, the yaw rate and the skew running angle, the speed of the free-rolling wheel can then be estimated.

9 Claims, 4 Drawing Sheets

METHOD FOR ESTIMATING SPEED OF A BRAKED VEHICLE

BACKGROUND OF THE INVENTION

In order to calculate the brake slip, which is defined by $$S = 1 - Vr/Vfr$$

known methods of brake slip control usually employ a reference speed Vref, which is formed either with reference to the wheels or with reference to the vehicle, instead of the free-rolling (unbraked) wheel peripheral speed Ffr. Because, generally speaking, $$Vref \neq Vfr$$

the "relative slip" calculated from Vref $$Sref = 1 - Vr/Vref$$

does not correspond to the absolute slip either. WO 89/02382, for example, describes a method for obtaining Vref and for control to a desired relative slip.

In many applications (for example the control of vehicle yaw motion or transverse motion and observation units for yaw and transverse motion), it is necessary to know the absolute slip as accurately as possible.

The object of the invention is to make it possible to estimate the actual free-rolling wheel peripheral speeds and the vehicle longitudinal speed so that the absolute slip and other derived values can be more accurately determined.

SUMMARY OF THE INVENTION

The above object is achieved according to the present invention by a method for determining the speed of a braked vehicle and/or the free-rolling peripheral speed of at least one of the vehicle wheels with the aid of measurement of the instantaneous wheel speed of the at least one vehicle wheel wherein: the brake pressure on at least one vehicle wheel is periodically reduced (adaptation condition) such that the working point (operating point) of the at least one wheel is located in the substantially linear range of the braking force characteristic as a function of wheel slip; the free-rolling peripheral speed Vfri of the wheel i is determined during the adaptation condition from the instantaneous wheel speed Vri and the braking force $F_{Bi}$ at the associated wheel i; a vehicle speed Vf' referenced, or relative, to a desired point on the vehicle is determined from the free-rolling peripheral speed Vfri using measured parameters for steering angle δ and yaw angular velocity $\dot{\psi}$ about the vehicle vertical axis, the skew running angle αi of the wheels, and the vehicle dimensions; the estimated value for the vehicle speed $\hat{V}f$ and the acceleration error $b_o$ are obtained using the filter equations $$\frac{d\hat{V}f}{dt} = \hat{b}_O + b(t) + K1 \cdot (Vf' - \hat{V}f)$$

and $$\frac{d\hat{b}_O}{dt} = K2 \cdot (Vf' - \hat{V}f);$$

and with the aid of the estimated value $\hat{V}f$ referenced to the vehicle point, the steering angle δ, the yaw rate $\dot{\psi}$ and the skew running angle αi parameters, together with vehicle dimensions referenced to the vehicle point; at least one estimated value $\hat{V}fri$ is obtained for the free-rolling speed of the at least one wheel i, where $$b(t) = \frac{1}{m_F} \sum_{i=1}^{4} F_{Bi(t)}$$

is the acceleration estimated from the vehicle mass $m_F$ and the braking forces $F_{Bi}$, $\hat{b}_o$ is an error term and K1 and K2 are correction amplifications which are positive during the adaptation condition and are zero outside this condition.

According to a preferred feature of the invention, the wheel slip S is determined from the measured value of the wheel speed and the estimated free-rolling wheel speed.

DETAILED DESCRIPTION OF THE PREFERRED EMBODIMENT

Figure 2A:
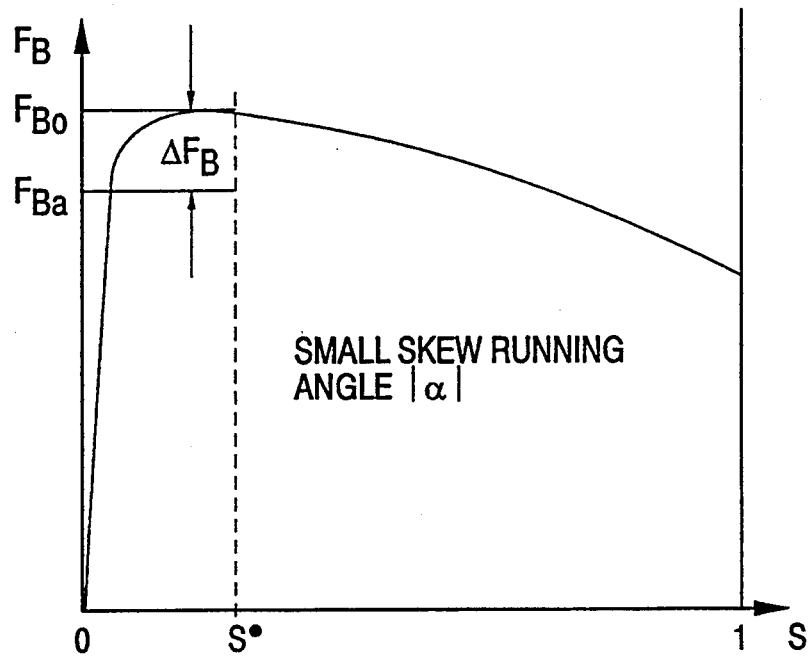
FIGS. 2a and 2b are graphs of braking force as a function of slip for two different skew running angles used to illustrate the respective relative force reductions utilized during the method according to the invention.

A precondition for the method according to the present invention is that one vehicle wheel (at least) is underbraked from time to time. In these "adaptation phases", the slip should be within the (almost) linear range of the $F_B(S)$ characteristic (FIG. 2a). In order to achieve this, a reduction by Δ $F_B$ is undertaken starting from the braking force level which occurs in the normal (slip) control condition. This takes place by means of a corresponding reduction in the wheel brake cylinder pressure. So that the resulting reduction in braking should remain as small as possible, several wheels should not be in the adaptation condition simultaneously.

In contrast to known methods for calculating reference speeds, the estimation of the vehicle longitudinal speed permits the calculation of the absolute physical slip.

Knowledge of this parameter is a precondition for estimating the vehicle transverse motion. Whereas reference-based slip values are generally adequate in the optimisation of tyre longitudinal forces, future vehicle control systems require both the absolute brake slip values and the skew running angles.

In addition to the wheel speed signals, the method according to the invention uses only the vehicle kinematic parameters and the estimates of the braking forces, which are present in any case in vehicle control systems, so that no additional measurement requirements arise.

The starting point is provided by the following filter equations for the vehicle longitudinal motion:

$$\frac{d\hat{V}f}{dt} = \hat{b}0 + b(t) + K1(t) * (Vf - \hat{V}f) \quad (1)$$

$$\frac{d\hat{b}0}{dt} = K2(t) * (Vf - \hat{V}f)$$

in which $$b(t) = -\frac{1}{mf} \sum_{i=1}^{4} F_{Bi}(t) \quad (2)$$

is the vehicle acceleration estimated from the vehicle mass mf and the sum of the braking forces $F_{Bi}$. Because the vehicle acceleration calculated in this way is subject to errors because of perturbation effects, such as a hill downward force, an error term bO is also estimated. The two correction amplifications K1(t) and K2(t) are selected as zero at the point where none of the wheels is in the adaptation condition, otherwise they are positive. They can then have constant specified values, for example. The use of a Kalman filter in which the correction amplifications are generally variable with time is also, however, possible.

The correction value Vf used in Eq. (1) is formed in the adaptation condition of a wheel. For this purpose, the free-rolling wheel peripheral speed Vfri' of the adapting wheel 1 is first determined from the wheel peripheral speed Vri and the braking force $F_{Bi}$ of this wheel 1 by using $$Vfri' = \frac{Vri}{1 - F_{Bi}/ci} \quad (3)$$

The expression $F_{Bi}/ci$ in Eq. (3) corresponds to the brake slip S.

In Eq. (3), ci signifies the longitudinal stiffness of the tyre, which is an approximately known tyre constant.

Figure 1:
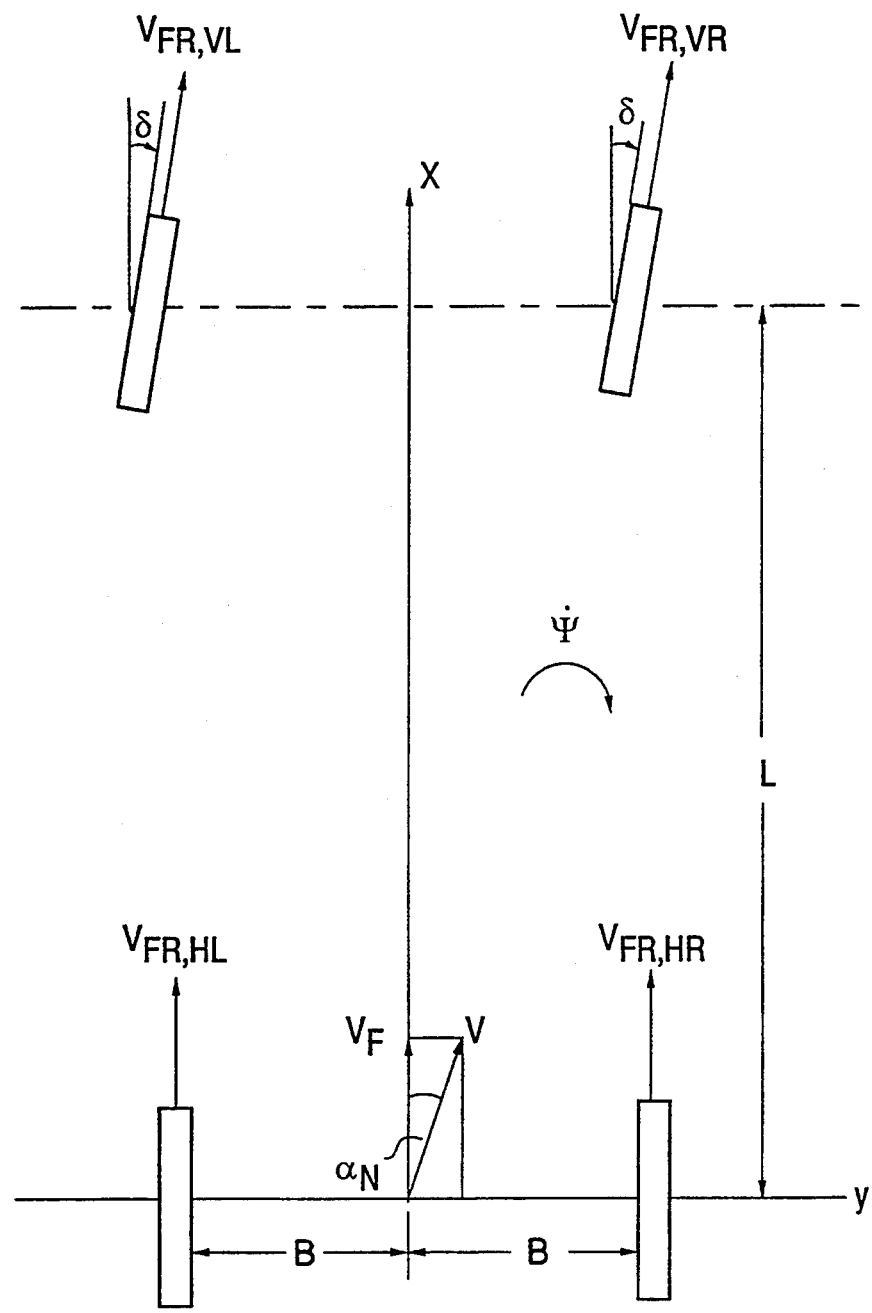
FIG. 1 is a schematic plan view of a four wheeled vehicle showing various geometrical relationships necessary to explain the method according to the invention.

In a second step, the free-rolling wheel peripheral speed Vfri' is recalculated relative to a fixed vehicle point, for example relative to the centre of the rear axle—as shown in FIG. 1. Using the sign convention adopted in FIG. 1 for the steering angle δ and the yaw angular velocity $\dot{\psi}$ about the vehicle vertical axis and using the wheel base L and the track half width B, the following conversion prescriptions are obtained:

$$Vf = \frac{Vfri' - \dot{\psi} * (L * \sin\delta + B * \cos\delta)}{\cos\delta + \tan\alpha_H * \sin\delta} \quad \text{if } i = \text{front left} \quad (4)$$

$$Vf = Vfri' + B * \dot{\psi} \quad \text{if } i = \text{rear right}$$

$$Vf = \frac{Vfri' - \dot{\psi} * (L * \sin\delta - B * \cos\delta)}{\cos\delta + \tan\alpha_H * \sin\delta} \quad \text{if } i = \text{front right}$$

$$Vf = Vfri' - B * \dot{\psi} \quad \text{if } i = \text{rear left}$$

In order to use Eq. (4), it is necessary to know δ, $\dot{\psi}$ and the skew running angle at the rear axle, $\alpha_H$. If this determination of the vehicle longitudinal speed is, for example, used in conjunction with a vehicle control system with an observer unit for the vehicle transverse motion, measurement signals are generally available for δ and $\dot{\psi}$. The estimated value, formed in an observer unit, for the skew running angle of the rear wheels can be used for $\alpha_H$. The skew running angles of the wheels of one axle are, generally speaking, almost identical.

Using Equations (1) to (4), estimated values can be obtained for the vehicle longitudinal speed and the acceleration errors—$\hat{V}f$ and $\hat{b}O$. The estimated values Vfri for the free-rolling wheel speeds can be formed at any time from Vf by means of the conversion specifications which are the inverse of Equation (4):

$$\hat{V}fri = \hat{V}f * (\cos\delta + \tan\alpha_H * \sin\delta) + \quad \text{if } i = \text{front left} \quad (5)$$
$$\dot{\psi} * (L * \sin\delta + B * \cos\delta)$$
$$\hat{V}fri = \hat{V}f - B * \dot{\psi} \quad \text{if } i = \text{rear right}$$
$$\hat{V}fri = \hat{V}f * (\cos\delta + \tan\alpha_H * \sin\delta) + \quad \text{if } i = \text{front right}$$
$$\dot{\psi} * (L * \sin\delta - B * \cos\delta)$$
$$\hat{V}fri = \hat{V}f + B * \dot{\psi} \quad \text{if } i = \text{rear left}$$

The estimates for the absolute brake slip values are then $$\hat{S}i = 1 - Vri/\hat{V}fri, \; i=1\ldots4$$

In order to calculate the vehicle acceleration from Eq. (2), to calculate the free-rolling wheel speeds from Eq. (3) and to effect the underbraked adaptation phases, (approximate) knowledge of the braking force $F_{Bi}$ is necessary. The initial equation for determining these forces is the simplified angular momentum equation for the wheel i:

$$\frac{Ji}{ri} * \frac{dVri}{dt} = -cpi * Pi + F_{Bi} * ri \quad (7)$$

where
Pi wheel brake pressure,
ri wheel radius,
Ji mass moment of inertia of the wheel and drive locations,
cpi brake torque amplification For (approximately) known system parameters ri, Ji and cpi, $F_{Bi}$ can be determined from the wheel brake pressure Pi by using $$F_{Bi} = \frac{1}{ri} * \left( \frac{Ji}{ri} * \frac{dVri}{dt} + cpi * Pi \right) \quad (8)$$

If the wheel brake pressure Pi is not measured, an estimate for the wheel brake pressure can also be used instead of Pi. In the phases with normal control to a required slip S*, the instantaneous braking force is filtered in accordance with Eq. (8), for example by using the relationship $$\frac{dF_BOi}{dt} = K3 * (F_{Bi} - F_BOi), \quad (9)$$

K3 ... constant to be specified.

The estimate $F_BOi$ for the normal braking force level is used as the reference parameter for the braking force during the adaptation phases. During these phases, a reduced braking force $$F_Bai = F_BOi - \Delta F_{Bi} \quad (10)$$

is to be set. This is done by reducing the wheel brake pressure—or its estimated value—to $$Pai = \frac{1}{cpi} * \left( F_{Bai} * ri - \frac{Ji}{ri} * (\hat{b}0 + b(t)) \right) \quad (11)$$

and then waiting until the Vri(t) curve becomes steady.

Figure 2B:
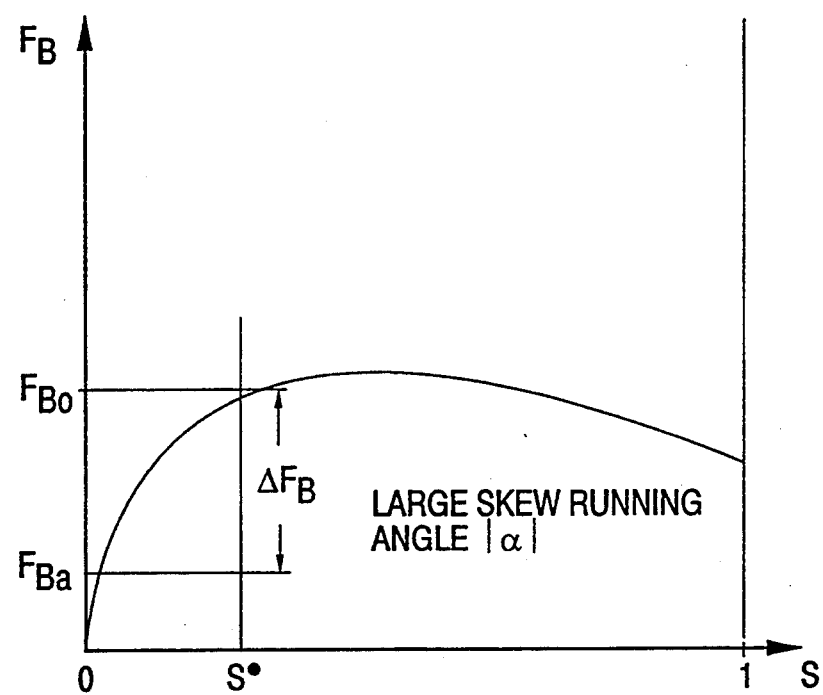

The braking force reduction $\Delta F_{Bi}$ in Eq. (10) is determined as a function of the skew running angle $\alpha$ i occurring on the wheel subject to adaptation. This is estimated by a vehicle observer unit, for example. At a large skew running angle, a larger $\Delta F_{Bi}$ is required than that needed with a small skew running angle (see FIGS. 2a and 2b) in order to be within the approximately linear range of the curve $F_{Bi}(S)$. Since, from experience, larger fluctuations of $F_{Bi}$ occur with large braking forces than with small braking forces (due, for example, to wheel load changes and elastic vibrations in the tyres and wheel suspension), it is useful—to secure against perturbations—to make $\Delta F_{Bi}$ additionally dependent on $F_BOi$:

$$\Delta F_{Bi} = f(F_{BOi}, \alpha i), \quad (12)$$

where $F_{BOi}$ is the brake pressure level.

A suitable function f is, for example, $$f(F_{BOi}, \alpha i) = F0 + F_{BOi} * F1 + |\alpha i| * F2, \quad (13)$$

where F0, F1, F2 ... are constants to be specified.

Because Fbai must always be greater than or equal to zero, $\Delta F_{Bi}$ must be limited to $$\Delta F_{Bi} \leq F_{BOi} \quad (14)$$

Figure 3:
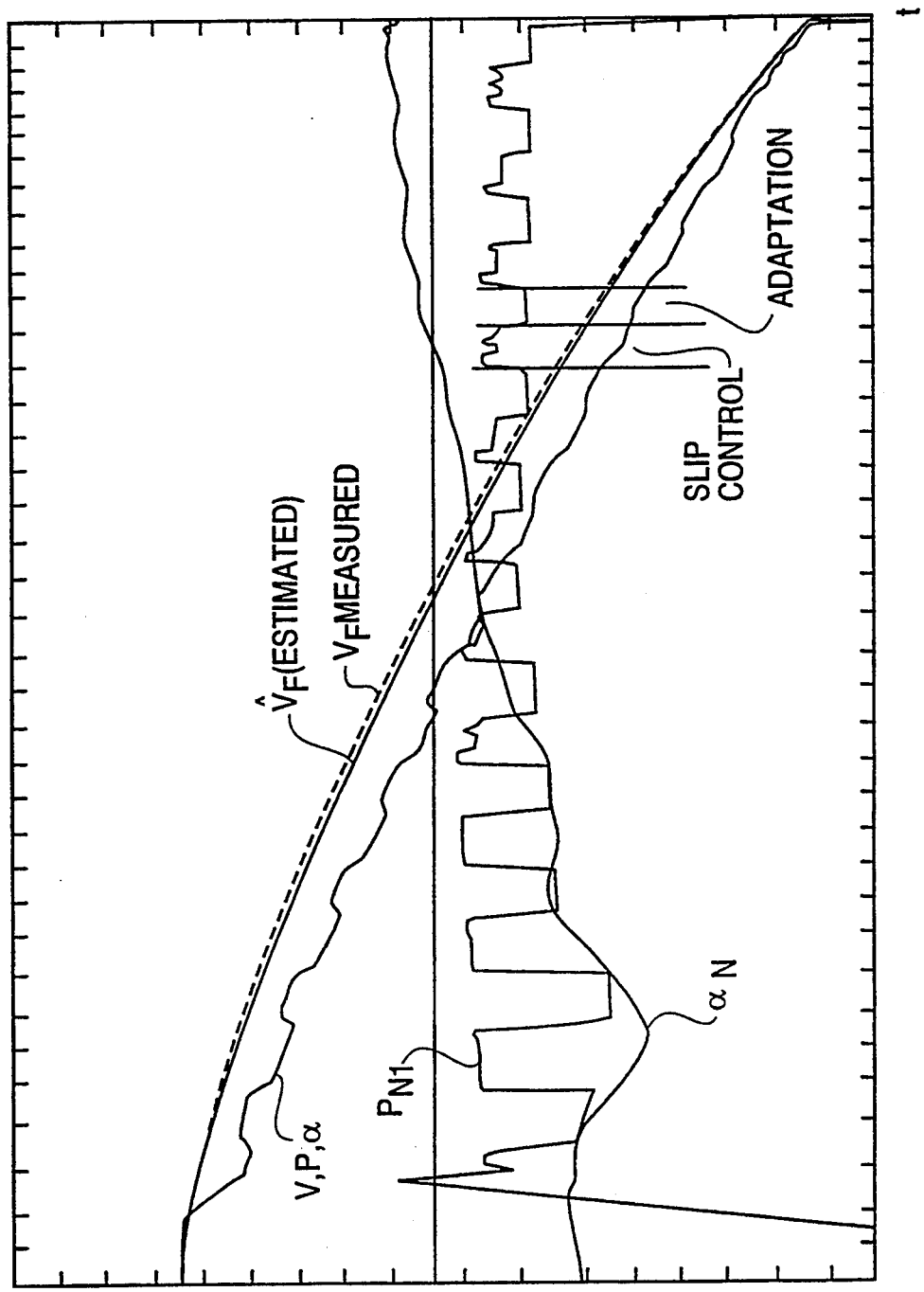
FIG. 3 is a graph showing the variation with time of the estimated vehicle speed resulting according to the present invention, the associated wheel speed of a rear wheel, the associated brake pressure of a rear wheel and the associated skew running angle of the rear wheel, as well as the corresponding actual or measured vehicle speed.

FIG. 3 shows an example of the variation with time of $\hat{V}f$, Vr_HL, P_HL, $\alpha_H$ and, as a comparison, the exact Vf curve. In this example, only the two rear wheels are used for Vf estimation and are, for this purpose, underbraked alternately.

Figure 4:
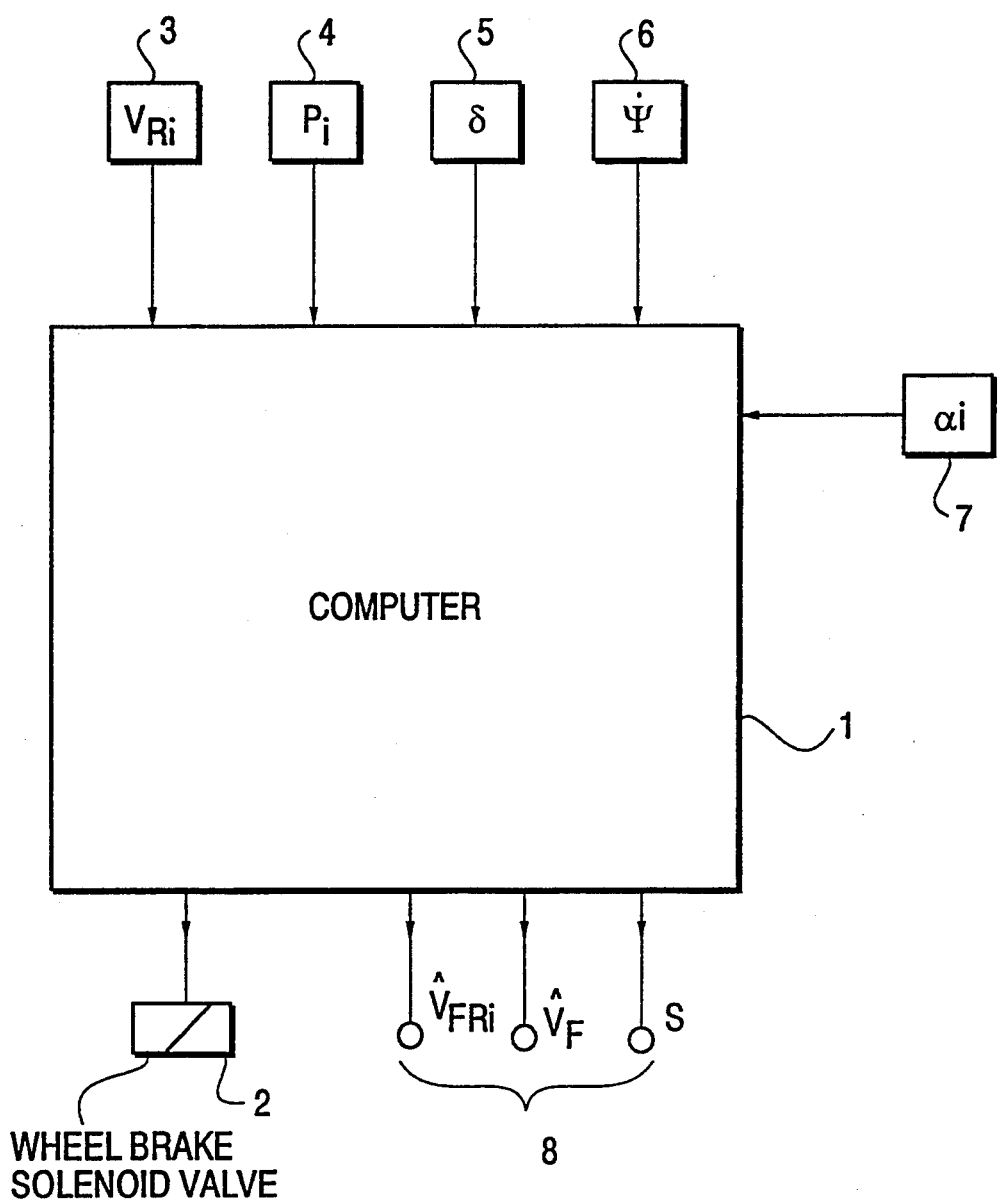
FIG. 4 is a block circuit diagram of an arrangement for carrying out the method according to the invention.

The illustrative example of FIG. 4 shows a computer 1 which reduces the brake pressure at one wheel from time to time by means of a solenoid valve 2. During these phases, the wheel speed $V_{Ri}$ is measured by means of the sensor 3 and the brake pressure Pi at this wheel is also measured (sensor 4). In addition, the steering angle δ (sensor 5) and the yaw rate $\dot{\psi}$ (sensor 6) are also measured. An observer unit 7 determines the skew running angle $\alpha i$. The computer 1 now carries out the calculations given above and can emit signals at the terminals 8 corresponding to the estimated speed $\hat{V}_{fRi}$ of the free-rolling wheel, the estimated vehicle speed $\hat{V}f$, and/or the absolute wheel slips.

I claim:

1. Method for determining speed of a braked vehicle and free-rolling peripheral speed of at least one vehicle wheel comprising: measuring instantaneous wheel speed of at least one vehicle wheel; reducing brake pressure on the at least one vehicle wheel from time to time, to define an adaptation condition in which a working point of the at least one wheel is located in a substantially linear range of a braking force verses wheel slip characteristic; determining a free-rolling peripheral speed Vfri of the at least one wheel i in the adaptation condition from the instantaneous wheel speed Vri and a braking force $F_{Bi}$ at the associated wheel i; determining steering angle δ, yaw angular velocity $\dot{\psi}$ about a vertical vehicle axis and skew running angle $\alpha i$ of the vehicle wheels; calculating a vehicle speed Vf' relative to a point on the vehicle from the free-rolling peripheral speed Vfri, the determined parameters of the steering angle δ, the yaw angular velocity $\dot{\psi}$ about the vehicle vertical axis and the skew running angle $\alpha i$ of the wheels, and known vehicle dimensions; determining an estimated value for the vehicle speed $\hat{V}f$ and an acceleration error $b_o$ by using filter equations $$\frac{d\hat{V}f}{dt} = \hat{b}_0 + b(t) + K1 \cdot (Vf' - \hat{V}f)$$

and $$\frac{d\hat{b}_0}{dt} = K2 \cdot (Vf' - \hat{V}f)$$

and obtaining at least one estimated value Vfri for the free rolling speed of the at least one wheel using the estimated vehicle speed value $\hat{V}f$ relative to the point on the vehicle, the steering angle δ, the yaw angular velocity $\dot{\psi}$ and the skew running angle $\alpha i$ parameters, together with the known vehicle dimensions referenced to the point on the vehicle, where $$b(t) = \frac{1}{m_F} \sum_{i=1}^{4} F_{Bi(t)}$$

is an acceleration estimated from a vehicle mass $m_F$ and the braking forces $F_{Bi}$, $\hat{b}_o$ is an error term and K1 and K2 are correction amplifications which are positive in the adaptation condition and are zero outside the adaptation condition.

2. Method according to claim 1, further comprising determining a wheel slip S from the measured value of the instantaneous wheel speed and the estimated value of the free-rolling wheel speed.

3. Method according to claim 1, wherein the skew running angle $\alpha i$ is estimated by an observer unit.

4. Method according to claim 1, wherein the braking forces $F_{Bi}$ are determined from the brake pressures.

5. Method according to claim 4, wherein the brake pressures are measured.

6. Method according to claim 4, wherein the brake pressures are estimated.

7. Method according to claim 1, wherein the braking forces $F_{Bi}$ are filtered to a required slip S in brake pressure control phases.

8. Method according to claim 1, wherein the step of reducing the braking force reduces the braking force in dependence on the skew running angle.

9. Method according to claim 1, wherein the step of reducing the braking force reduces the braking force in dependence on the braking force level actually present.

* * * * *